US006049816A

United States Patent [19]

[11] Patent Number: 6,049,816

Kim et al.

[45] Date of Patent: Apr. 11, 2000

[54] PIPELINE STOP CIRCUIT FOR EXTERNAL MEMORY ACCESS

[75] Inventors: Bong-Kyun Kim; Jin-Hyeock Im, both of Seoul, Rep. of Korea

[73] Assignee: LG Electronics, Inc., Seoul, Rep. of Korea

[21] Appl. No.: 09/001,010

[22] Filed: Dec. 30, 1997

[30] Foreign Application Priority Data

Dec. 30, 1996 [KR] Rep. of Korea ...................... 96/77533

[51] Int. Cl.[7] ................................ G06F 7/38; G06F 9/00; G06F 9/22

[52] U.S. Cl. ........................... 708/521; 712/205; 712/245

[58] Field of Search ..................................... 708/490, 521, 708/525; 712/205, 206, 207, 245, 248

[56] References Cited

U.S. PATENT DOCUMENTS

| | | | |
|---|---|---|---|
| 5,050,068 | 9/1991 | Dollas et al. | 395/382 |
| 5,222,241 | 6/1993 | Murakami et al. . | |
| 5,237,667 | 8/1993 | Murakami et al. | 395/598 |
| 5,442,799 | 8/1995 | Murakami et al. | 395/800.36 |
| 5,594,914 | 1/1997 | Coomes et al. | 395/800.42 |
| 5,710,914 | 1/1998 | Verbauwhede et al. | 395/595 |

*Primary Examiner*—Chuong Dinh Ngo

[57] ABSTRACT

A pipeline stop circuit for an external memory access which is capable of effectively performing a pipeline operation by temporarily stopping a pipeline operation, which is being operated, until data are prepared in the memory accessed, when accessing an external memory or a slow internal memory. The processor includes a program selection unit for carrying one of a program from an internal RAM and a program from an external program memory onto a program bus in accordance with an external program request signal and an external memory preparation signal, an instruction fetch unit for fetching the program carried on the program bus in accordance with a program wait signal and a data wait signal and outputting an instruction, an instruction decoding unit for decoding an instruction from the instruction fetch unit, and a control signal generation unit for fetching a decoding signal from the instruction decoding unit, outputting a control signal, and stopping a fetching operation of the decoding signal when the program wait signal or data wait signal is activated.

5 Claims, 8 Drawing Sheets

FIG.1A CONVENTIONAL ART FIRST INSTRUCTION

FIG.1B CONVENTIONAL ART SECOND INSTRUCTION

FIG.1C CONVENTIONAL ART THIRD INSTRUCTION

FIG.1D CONVENTIONAL ART FORTH INSTRUCTION

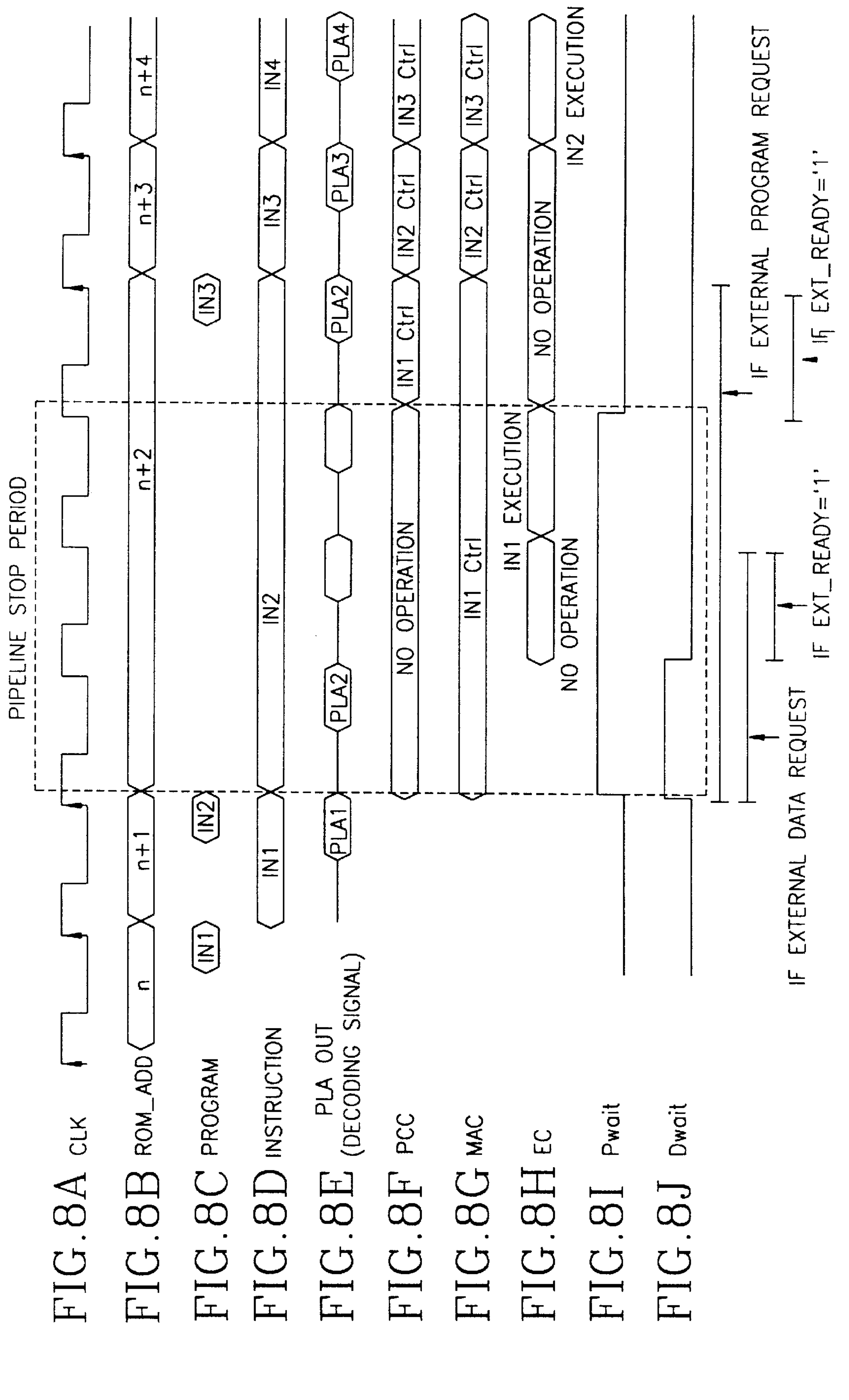
FIG.8A CLK
FIG.8B ROM_ADD
FIG.8C PROGRAM
FIG.8D INSTRUCTION
FIG.8E PLA OUT (DECODING SIGNAL)
FIG.8F PCC
FIG.8G MAC
FIG.8H EC
FIG.8I Pwait
FIG.8J Dwait
PIPELINE STOP PERIOD
n
n+1
n+2
n+3
n+4
IN1
IN2
IN3
IN1
IN2
IN3
IN4
PLA1
PLA2
PLA2
PLA3
PLA4
NO OPERATION
IN1 Ctrl
IN2 Ctrl
IN3 Ctrl
IN1 Ctrl
IN2 Ctrl
IN3 Ctrl
NO OPERATION
IN1 EXECUTION
NO OPERATION
IN2 EXECUTION
IF EXTERNAL DATA REQUEST
IF EXT_READY='1'
IF EXTERNAL PROGRAM REQUEST
IF EXT_READY='1'

PIPELINE STOP CIRCUIT FOR EXTERNAL MEMORY ACCESS

BACKGROUND OF THE INVENTION

1. Field of the Invention

The present invention relates to a pipeline stop circuit for an external memory access, and in particular to an improved pipeline stop circuit for an external memory access which is capable of more effectively operating a pipeline operation when accessing an external memory or a slow internal memory.

2. Description of the Background Art

Generally, the pipeline in a processor is a bus operation process during the execution of an instruction. For example, the pipeline is implemented in the following four steps: "Instruction fetch→Decode→Operand fetch→Execution."

As shown in FIGS. 1A–1D, after a first instruction INT1 is fetched, a new second instruction INT2 is fetched at the time when the first instruction INT1 is being decoded, and the second instruction INT2 is decoded at the time when the first instruction INT1 is operand-fetched (control signal generation). When the first instruction INT1 is executed, the second instruction INT2 is operand-fetched. At this time, a third instruction INT3 is decoded, and a new fourth instruction INT3 is fetched. Therefore, one instruction is independently executed in one clock.

As shown in FIG. 2, the processor performing the four-step pipeline includes an instruction decoding unit 10 for decoding a program from a ROM 13 and outputting a control signal for a pipeline operation, a program counter 11 for accessing the ROM 13 in accordance with a control of the instruction decoding unit 10, a memory access unit 12 for receiving a ROM address ROM_ADD from the program counter 11 and accessing the RAM 14 in accordance with a data memory address from the memory access unit 12 and a control from the instruction decoding unit 10, and an arithmetic operation unit 15 for computing an output data from the RAM based on the program from the ROM 13 in accordance with a control of the instruction decoding unit 10.

The operation of the conventional processor will now be explained with reference to the accompanying drawings FIGS. 3A–3G.

The program counter 11 generates a ROM address ROM_ADD, as shown in FIGS. 3A and 3B, at every cycle of an external clock signal CLK, and the ROM 13 loads the program shown in FIG. 3C onto the program bus PBUS in accordance with a ROM address ROM_ADD.

The memory access unit 12 accesses the data of the RAM in accordance with the ROM address ROM_ADD from the program counter 11 and the data memory address from the memory access unit 12 and outputs to the arithmetic operation unit 15. As a result, the arithmetic operation unit 15 computes the output data from the RAM 14 based on the program outputted from the ROM 13 in accordance with a control of the instruction decoding unit 10.

Namely, the instruction decoding unit 10 receives the program from the program bus PBUS as shown by FIGS. 3C and 3D during a fist cycle t1 of the clock signal CLK and fetches the first instruction. In addition, the instruction decoding unit 10 synchronizes the fetched first instruction as shown by FIGS. 3D and 3E to the clock signal CLK, thus decoding the same and fetching the second instruction during a second cycle t2 of the clock signal CLK.

In addition, the instruction decoding unit 10 decodes the decoding signal of the first instruction and outputs a control signal. The fetched second instruction is decoded, and the third instruction is fetched.

The instruction decoding unit 10 generates a control signal with respect to the second instruction during a fourth cycle t4 of the clock signal CLK, decodes the fetched third instruction, and fetches the fourth instruction. The arithmetic operation unit 15 executes a computation process for computing an output data from the RAM 14 based on the program of the ROM 13 in accordance with a control signal with respect to the first instruction from the instruction decoding unit 10. At this time, the operational speed of the ROM 13 and RAM 14 of the processor is fast so that the same can be fully operated in each step.

However, the external memory is not accessed as fast as the same, and cannot be fully operated in each step of the pipeline due to the delay time from the processor to the external memory. Even when an internal memory is used, if the operation speed of the same is slow, the assess time is increased.

In addition, when the processor reads/writes at the same time the data into/from the external program memory and external data memory through one port, the program memory and data memory do not output the program and data at the same time. Namely, the program and data are outputted to the processor by the following sequence: the program memory→the data memory, or the data memory→the program memory, so that the access time is increased.

Therefore, the conventional processor has a disadvantage in that the pipeline operation is not properly executed due to the delayed access time when the external memory is used or the slow internal memory is used.

SUMMARY OF THE INVENTION

Accordingly, it is an object of the present invention to provide a pipeline stop circuit for an external memory access which overcomes the aforementioned problems encountered in the background art.

It is another object of the present invention to provide a pipeline stop circuit for an external memory access which is capable of effectively performing a pipeline operation by temporarily stopping a pipeline operation, which is being operated, until data are prepared in the memory accessed, when accessing an external memory or a slow internal memory.

To achieve the above objects, there is provided a pipeline stop circuit for an external memory access which includes a program selection unit for carrying one of a program from an internal memory and an external program memory onto a program bus in accordance with an external program request signal and an external memory preparation signal, an instruction fetch unit for fetching the program carried on the program bus in accordance with a program wait signal and a data wait signal and outputting an instruction, an instruction decoding unit for decoding an instruction from the instruction fetch unit, a control signal generation unit for fetching a decoding signal from the instruction decoding unit, outputting a control signal, and stopping a fetching operation of the decoding signal when the program wait signal or data wait signal is activated, a program counter for accessing a program memory in accordance with a control signal from the control signal generation unit, a memory accessing unit for judging whether an internal memory is accessed or an external memory is accessed in accordance with a program address from the program counter and a data address stored in the memory access unit, accessing an internal memory RAM when the internal memory is accessed, generating an external program request signal and external data request signal when the external memory is judged to be accessed, accessing the external program memory and external data memory, and disabling a request signal of the memory when the external memory ready signal is a high level, a data selection unit for carrying, on the data bus, one of the data from the RAM and a data from the external data memory in accordance with an external memory ready signal and external data request signal, a wait signal generation unit for enabling the program wait signal and data wait signal for temporarily stopping an internal pipeline operation when the external program request signal and external data request signal from the memory access unit are activated, disabling the program wait signal and data wait signal when the external memory ready signal becomes a high level, and normally maintaining the stopped pipeline operation, and an arithmetic operation unit for computing an internal or external output data based on an external or internal program in accordance with a control signal from the control signal generation unit.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A–8J are stop timing diagrams illustrating a pipeline when an external data memory and external program memory are requested at the same time in the circuit of FIG. 5.

DETAILED DESCRIPTION OF THE PREFERRED EMBODIMENTS

Figure 1:
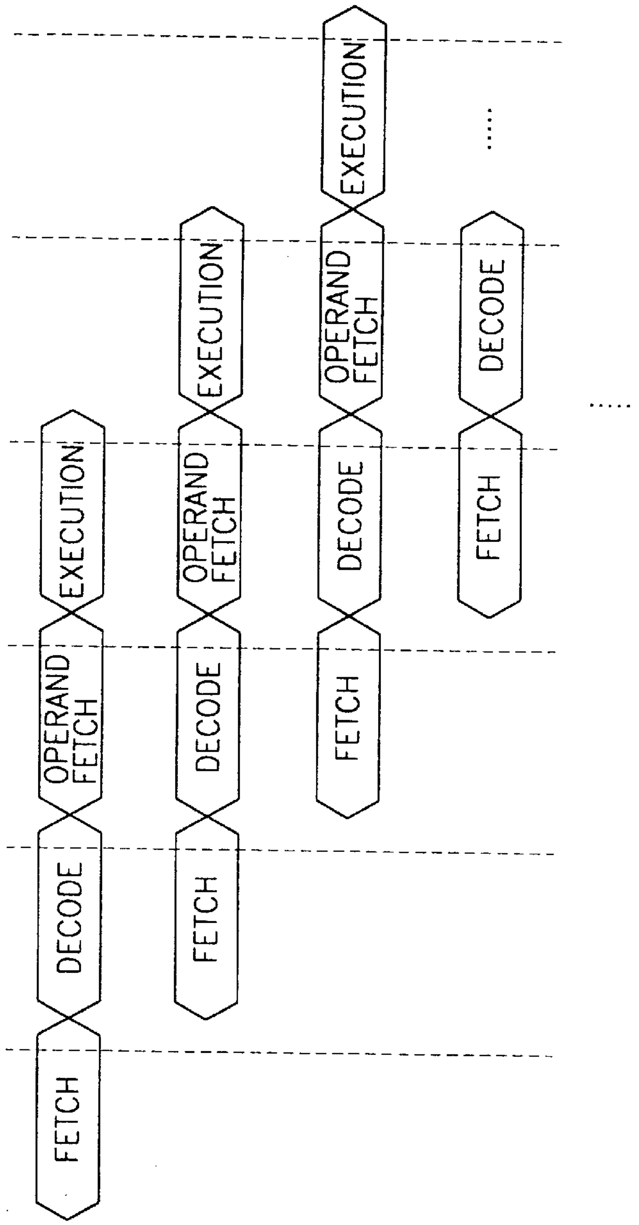
FIGS. 1A–1D are illustrate the construction of a conventional four-step pipeline.
Figure 2:
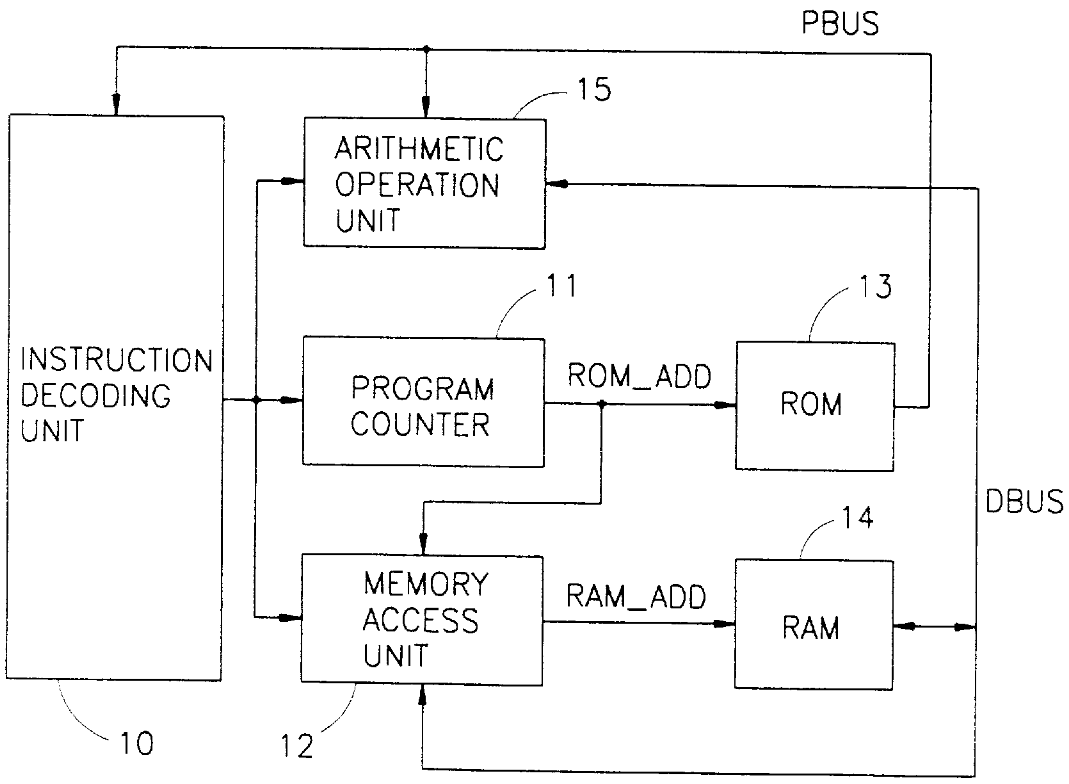
FIG. 2 is a block diagram illustrating a processor for operating a conventional four-step pipeline.
Figures 3A, 3B, 3C, 3D, 3E, 3F, 3G:
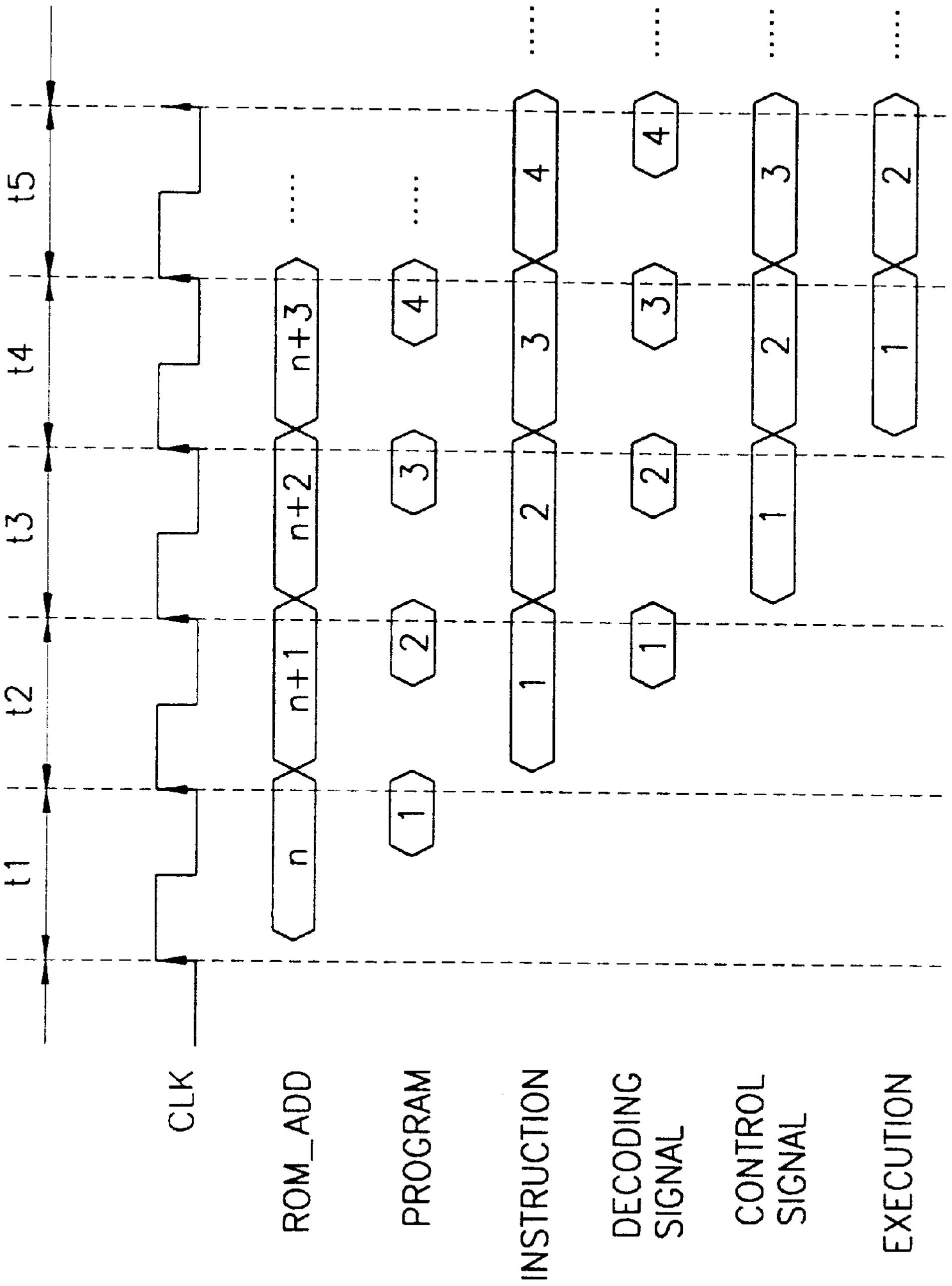
FIGS. 3A–3G are timing diagrams illustrating the conventional four-step pipeline of FIG. 2.
Figure 4:
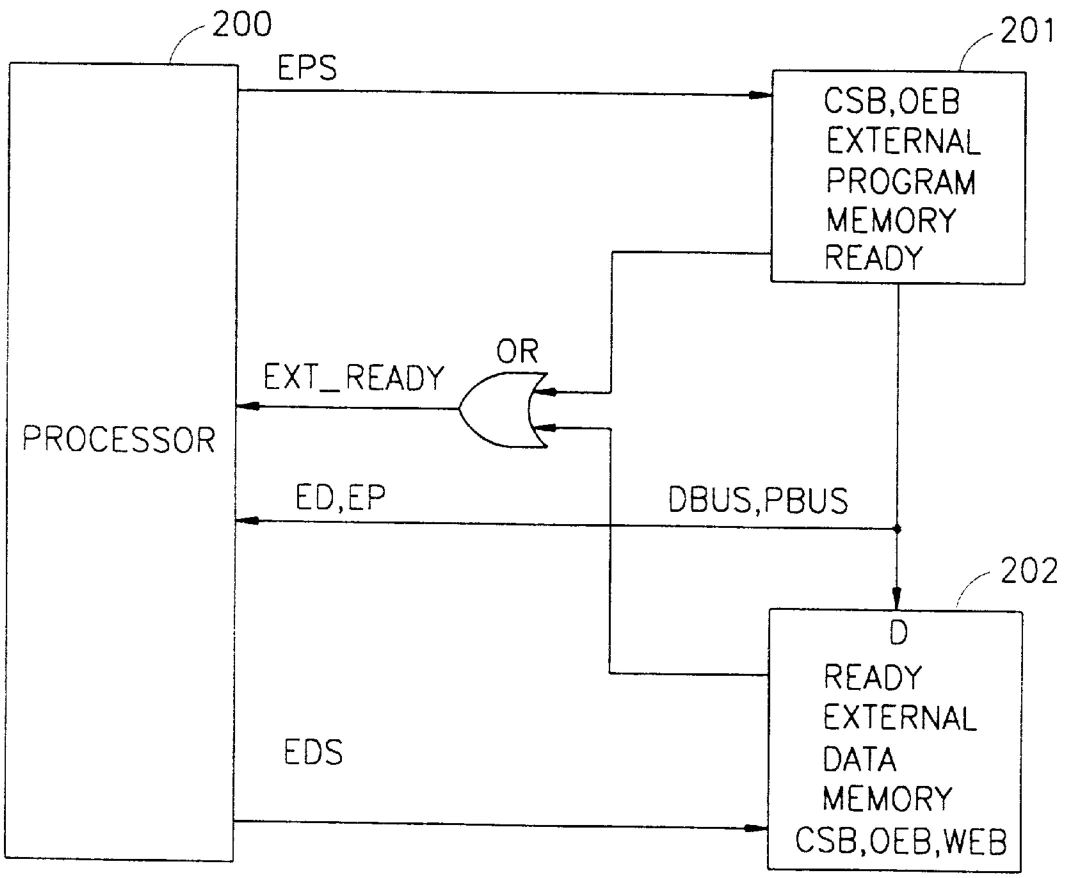
FIG. 4 is a block diagram illustrating a connection relationship between a processor and an external memory according to the present invention.

FIG. 4 illustrates an interrelationship between a processor 200 and an external program memory 201 and an external data memory 202.

While the processor 200 reads an internal memory and performs a pipeline operation, if an internal program or an external data is requested, the pipeline operation, which is being operated, is temporarily stopped, and an external program selection signal EPS and an external data selection signal EDS are activated, and the external program memory 201 and the external data memory 202 are accessed.

The external program memory 201 loads a ready program onto a program bus PBUS in accordance with an external program selection signal EPS of the processor 200 and sets a ready signal READY to a high level, and the external data memory 202 loads a ready program onto the data bus DBUS in accordance with an external data selection signal EDS of the processor 200 and sets the ready signal to a high level.

Therefore, when the external memory ready signal EXT_READY becomes a high level, the processor 200 reads the program loaded on the program bus PBUS the data bus DBUS or the data and continuously executes the pipeline operation which had been temporarily stopped.

Figure 5:
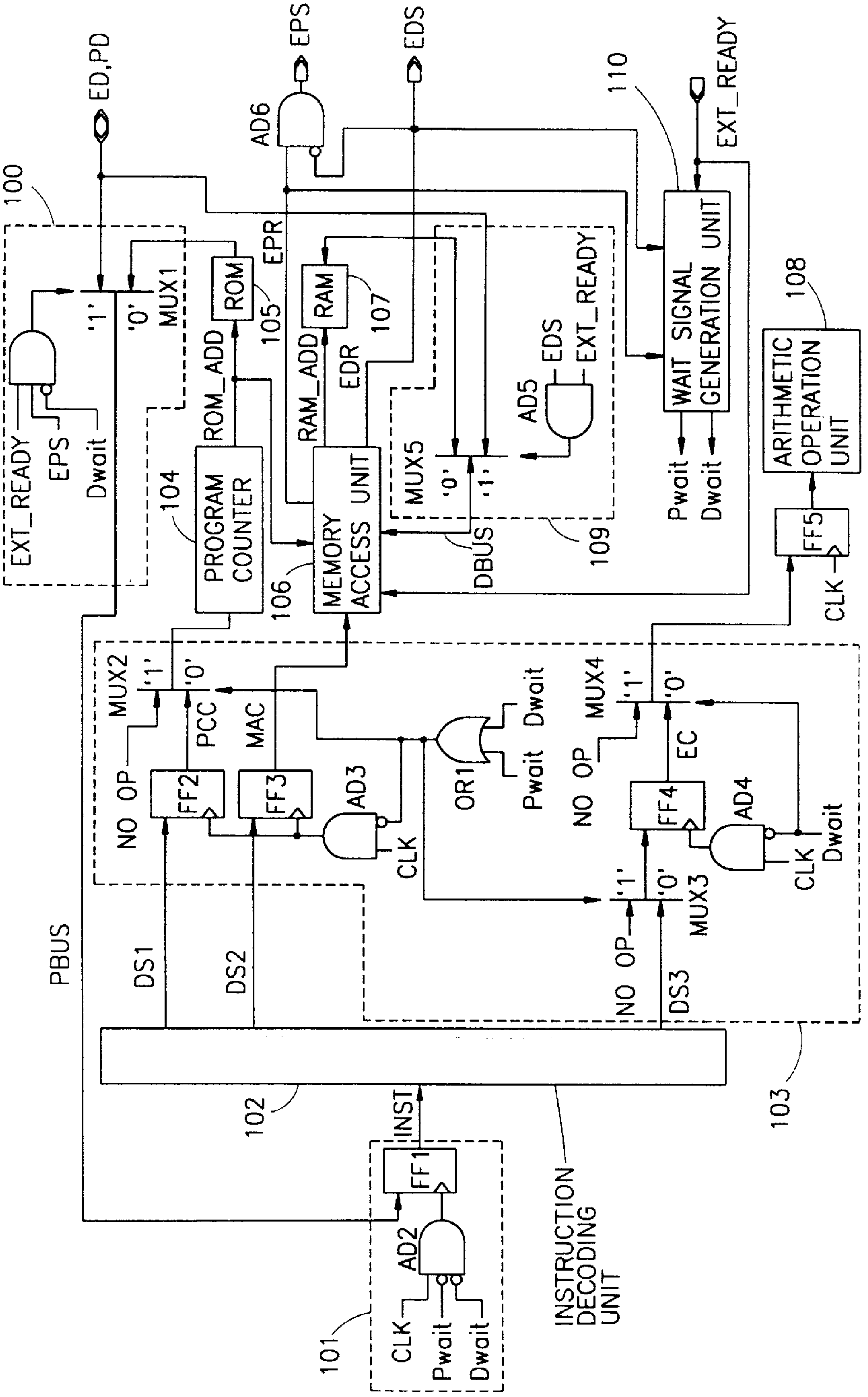
FIG. 5 is a block diagram illustrating a pipeline stop circuit for an external memory access according to the present invention.

FIG. 5 illustrates a pipeline stop circuit for an external memory access according to the present invention.

As shown therein, the program selection unit 100 carries, on the program bus PBUS, a one between the program read from an internal ROM 105 and the program PD read from the external program memory 201 in accordance with an external memory read signal EXT_READY and a data wait signal Dwait and an external program selection signal EPS.

The instruction fetch unit 101 fetches the program carried on the program bus PBUS at every rising edge of the clock signal at the usual time and outputs an instruction INST, and when the program wait signal Pwait or the data wait signal Dwait becomes a high level, respectively, namely the external program or data is requested, the fetch operation of the program is stopped. An instruction decoding unit 102 decodes the instruction INST from the instruction fetch unit 101 and outputs decoding signals D1 through D3.

The control signal generation unit 103 fetches the decoding signals D1 through D3 from the instruction decoding unit 102 in accordance with the clock signal CLK the at usual time and outputs a control signal PCC of a program counter 104, a control signal MAC of a memory access unit 106, and a control signal of an arithmetic operation unit 108. When an external program or data is requested, the fetching operation of the decoding signals D1 through D3 is stopped.

The memory access unit 106 reads the ROM address ROM_ADD outputted from the program counter 104 in accordance with a control signal MAC from the control signal generation unit 103 and determines whether it accesses the internal memory or the external memory. As a result of the judgement, when the external memory is accessed, the external program request signal EPR and the external data selection signal EDS are generated, and a data selection unit 109 carries, onto the data bus, a one between the data from a RAM 107 and the data ED from the external data memory 202 in accordance with an external memory ready signal EXT_READY and an external data request signal EDR.

A wait signal generation unit 110 enables a program wait signal Pwait and a data wait signal Dwait when an external program or data is requested, and temporarily stops an internal pipeline operation. When the external memory ready signal EXT_READY becomes a high level, the program wait signal Pwait and data wait signal Dwait are disabled, and the pipeline operation, which was stopped, is normally maintained.

The operation of the pipeline stop circuit for an external memory access according to the present invention will now be explained with reference to the accompanying drawings FIGS. 6A–6I, 7A–7I, and 8A–8J.

First, the accessing process of the internal memory is identical to the conventional art.

Namely, the program counter 104 generates a ROM address ROM_ADD at every cycle of the external clock signal CLK, and the ROM 105 carries a corresponding program onto the program bus PBUS through the program selection unit 100 in accordance with the ROM address ROM_ADD.

The memory access unit 106 receives the ROM address ROM_ADD from the program counter 104 and outputs a RAM address RAM_ADD in accordance with a data memory address, and the RAM 107 carries a corresponding data onto the data bus DBUS through the data selection unit 109 in accordance with the RAM address RAM_ADD, so that the data is inputted into the arithmetic operation unit 108 through the memory access unit 106.

In addition, the instruction fetch unit 101 fetches the program carried on the program bus PBUS at every rising edge of the clock signal CLK, thus outputting an instruction, and the instruction decoding unit 12 decodes the instruction inputted and outputs decoding signals DS1 through DS3. A control signal generation unit 103 fetches the decoding signals D1 through D3 from the instruction decoding unit 102 in accordance with a clock signal CLK and generates a control signal PCC of the program counter 104, a control signal of the memory access unit 106, and a control signal EC of the arithmetic operation unit 108.

As a result, the arithmetic operation unit 108 computes an output data from the RAM 107 based on the program outputted from the ROM 105 in accordance with the control signal EC. Thereafter, the above-described operation is repeatedly performed, so that the pipeline operation of each instruction is performed.

While the above-described pipeline operation is being repeatedly performed, when an external program or data is requested, the processor 200 outputs an external program selection signal EPS and an external data selection signal EDS and accesses the external program memory 201 and the external data memory 202. The inner pipeline operation is temporarily stopped, so that malfunction of the pipeline is prevented.

At this time, since the external program memory 201 and the external data memory 202, as shown in FIG. 4, communicate with the processor 200 for a data receiving and transmitting operation through one port, th operational speed is slow. Therefore, the processor 200 maintains a stopped internal operation while the accessed external program memory 201 or external data memory 202 are preparing data, so that the data communication is implemented.

The external memory access process will be explained by the following modes of operation.

During the pipeline operation, the memory access unit 106 reads the ROM address ROM_ADD outputted from the program counter 104 and the data address from the memory access unit 106 in accordance with a control signal MAC from the control signal generation unit 103 and judges whether it access the internal memory or external memory. As a result of the judgement, if it is judged that the external memory is to be accessed, a corresponding external program request signal EPR and external data request signal EDR are outputted as an external program selection signal EPS and external data selection signal EDS.

Operation 1. As a result of the checking the data memory access of the memory access unit, the external data is requested. See FIGS. 6A–6I.

Figures 6A, 6B, 6C, 6D, 6E, 6F, 6G, 6H, 6I:
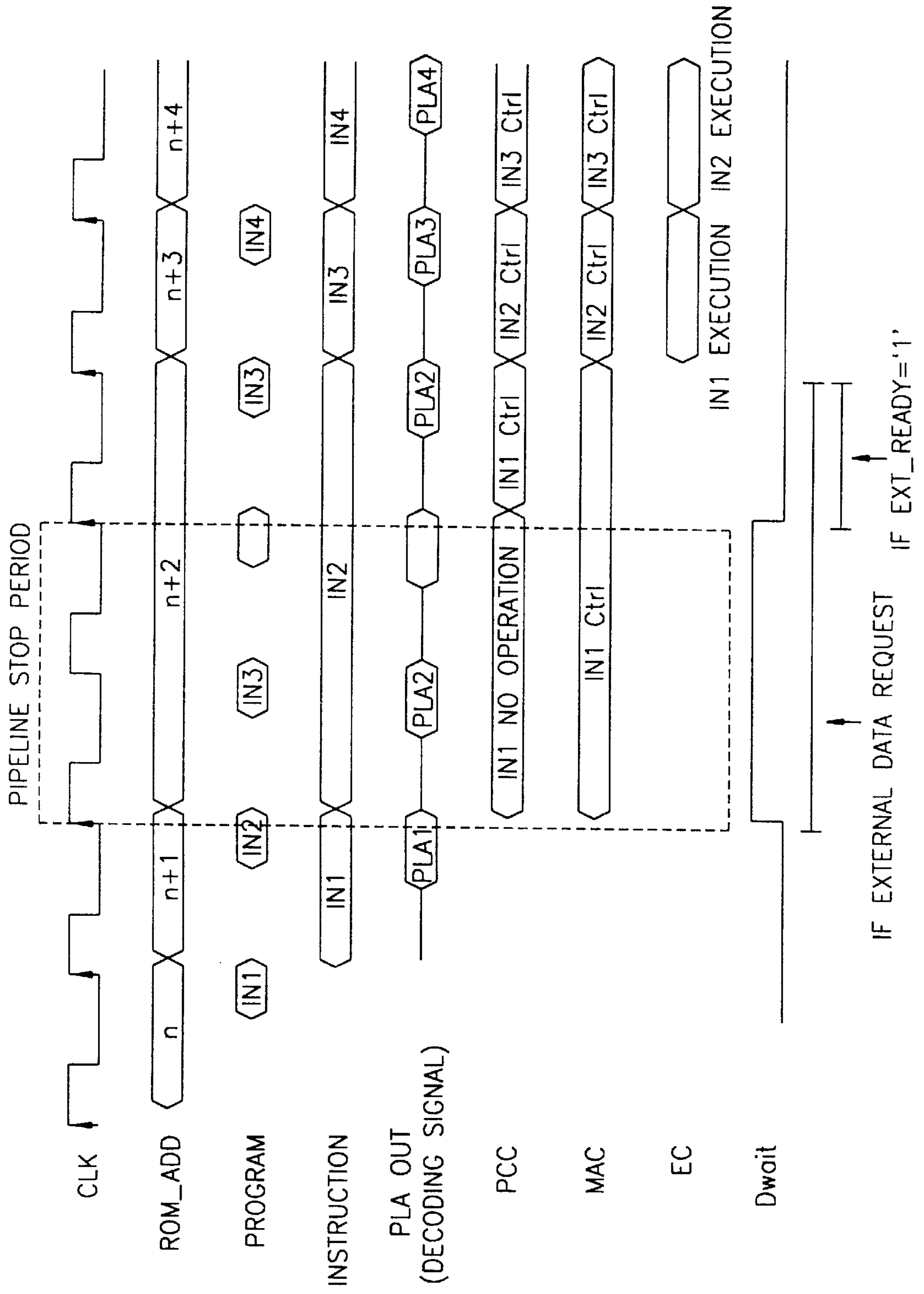
FIGS. 6A–6I are stop timing diagrams illustrating a pipeline when an external data memory is requested in the circuit of FIG. 5.

When an external data is requested, the memory access unit 106 outputs a high level external data request signal EDR to the external data memory 202 as an external data selection signal EDS, and the wait signal generation unit 110 receives the external data request signal EDR and generates a high level data wait signal Dwait as shown by FIG. 6I through the process shown in Table 1.

TABLE 1

```
Process()
begin
    if External Data Request = '1' then
            if Ext_Ready = '1' then
                Dwait <-- '0';
            else
                Dwait <-- '1';
            end if;
    else
            Dwait <-- '0';
    end if;
end process;
```

Therefore, the flip-flop FF1 of the instruction fetch unit 101 stops the fetching of the program from the program bus PBUS in accordance with a high level data wait signal Dwait, so that the operations of the flip-flops FF2, FF3 and FF4 of the signal generation unit 103 are stopped, and multiplexers MUX2, MUX3 and MUX4 select the operation stop instruction. As shown in FIGS. 6B and 6C, the program counter 104 and arithmetic computation unit 108 are stopped until the data wait signal DWAIT becomes a low level, and the operation of the pipeline is stopped. Since the memory access unit 106 generates an external data request signal EDR which is an input signal of the wait signal generation unit 110, the current state is maintained.

The external program memory 201 maintains a low level read state until the requested data is prepared, and when the requested data is prepared, the data ED is carried onto the data bus, thus changing the ready signal to a high level, so that the external memory ready signal EXT_READY from the OR-gate becomes a high level.

As the external memory ready signal EXT_READY becomes a high level, the data selection unit 109 of the processor 200 provides the external data ED carried on the data bus DBUS to the memory access unit 106, and the wait signal generation unit 110 changes the data wait signal Dwait to a low level through the process as shown in Table 1 when the external memory ready signal EXT_READY becomes a high level.

Therefore, the flip-flop FF1 of the instruction fetch unit 101 and the flip-flops FF2, FF3 and FF4 and multiplexers MUX2, MUX3 and MUX4 of the control signal generation unit 103 are operated, so that the pipeline operation, which was in the stop state, is normally performed.

Operation 2. As a result of the checking of the ROM address ROM_ADD, the external program is requested. See FIGS. 7A–7I.

Figures 7A, 7B, 7C, 7D, 7E, 7F, 7G, 7H, 7I:
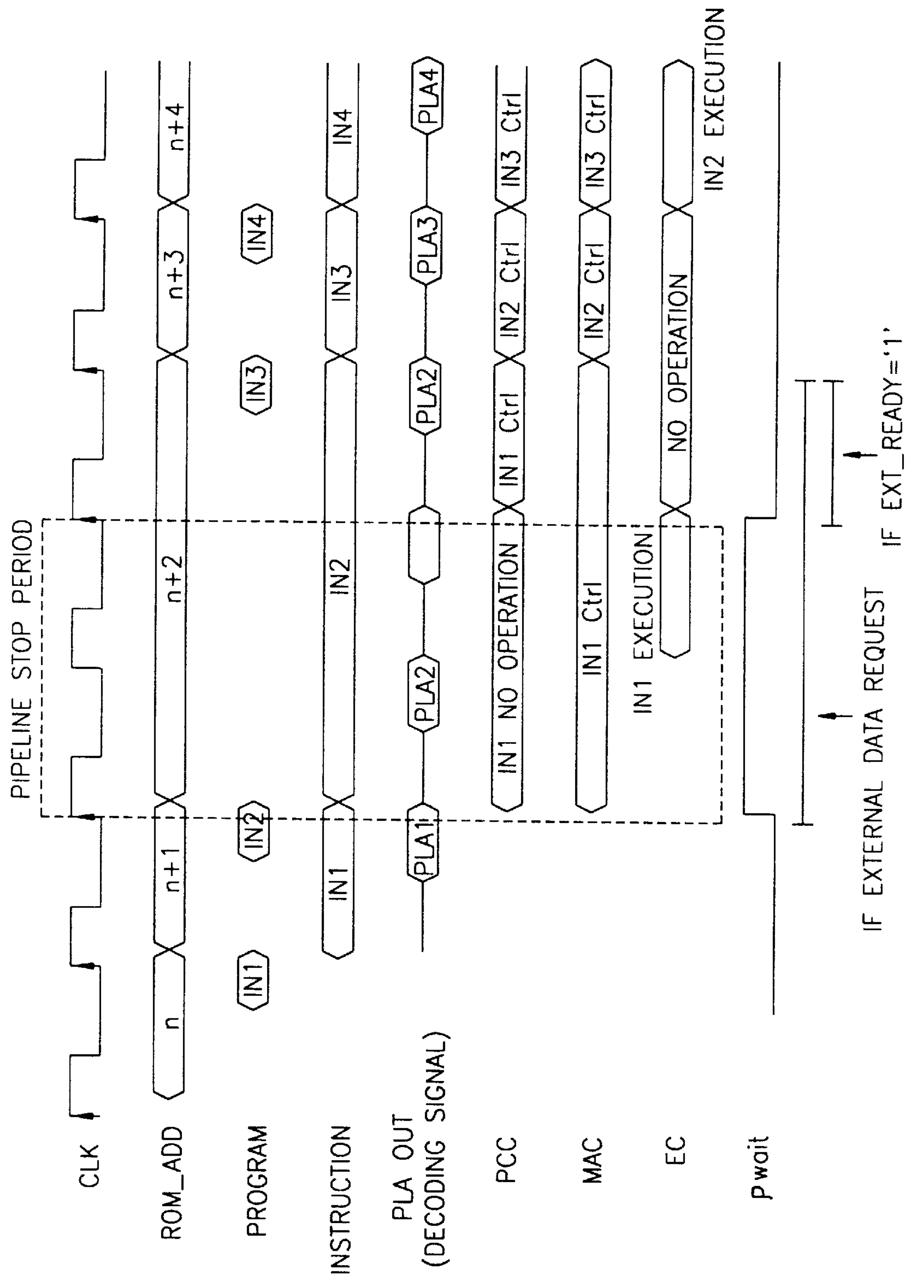
FIGS. 7A–7I are stop timing diagrams illustrating a pipeline when an external program memory is requested in the circuit of FIG. 5.

When an external program is requested, the memory access unit 106 outputs a high level external program request signal EPR to the external program memory 201 in accordance with the external program selection signal EPS, and the wait signal generation unit 110 receives an external program request signal EPR and generates a high level program wait signal Pwait as shown by FIG. 7I through the process shown in Table 2, which will be explained later. At this time, the program counter 104 maintains a stop state in accordance with the external program request signal EPR.

TABLE 2

```
Process()
begin
    if External Program Request = '1' then
        if External Data Request = '1' then
                Pwait <-- '1';
        else
                if Ext_ready = '1' then
                Pwait <-- '0';
            else
                Pwait <-- '1';
            end if;
        end if;
    else
            Pwait <-- '0';
    end if;
    end process
```

As a result, the flip-flop FF1 of the instruction fetch unit 101 stops the fetching of the program in accordance with a high level program wait signal Pwait, and the multiplexers MUX2 and MUX3 become non-operable state NO OP. In addition, the pipeline operation is stopped until the program wait signal Pwait becomes a low level, namely, the operation of "the instruction fetch→the decode→the operand fetch" is stopped. Since the instruction execution operation is not stopped, the first instruction is executed during the pipeline stop period.

The external program memory 201 maintains a low level ready signal until the requested program is prepared. When the program is prepared, the program EP is carried on the data bus DBUS, and the ready signal is changed to a high level.

Therefore, the program selection unit 100 of the processor 200 selects an external program EP carried on the program bus PBUS in accordance with the high level external memory ready signal EXT_READY and the external program request signal EPR and provides the thusly selected signal to the instruction fetch unit 101 through the program bus PBUS. The wait signal generation unit 110 receives the external memory ready signal EXT_READY and changes the program wait signal Pwait to a low level through the process shown in Table 2.

As a result, the flip-flops FF2 and FF3 and the multiplexors MUX2 and MUX3 of the control signal generation unit 103 are operated, so that the pipeline is normally operated.

Operation 3. As a result of the checking of the data memory address of the memory access unit 106 and the ROM address ROM_ADD, the external program and data are requested at the same time. See FIGS. 8A–8J.

When the external program data are requested at the same time, the memory access unit 106 outputs a high level signal and enables the external program selection signal EPS and external data selection signal EDS. Namely, if the external program request signal EPR and the external data request signal (EDR) are concurrently requested, the memory access unit 106 first selects the external data request signal EDR, and when the external memory ready signal EXT_READY is a high level, the external program request signal EPR is outputted through the AND-gate AD6.

At this time, since the wait signal generation unit 110 accesses the external program memory 201 and the data memory 202 through one port, the external data request is first processed by providing the priority thereto, and the external program request is processed later.

Namely, as shown in FIGS. 8I and 8J, the wait signal generation unit 110 outputs a wait signal by dividing the period into a period in which the program wait signal Pwait and data wait signal Dwait are high level at the same time and a period in which only the program wait signal Pwait is a high level.

As a result, in the period in which the program wait signal Pwait and data wait signal Dwait are concurrently high level, the operation is performed like the operation 1, and in the period in which only the program wait signal Pwait is a high level, the operation is performed like the operation 2. While the data and program access operation is being performed, the internal pipeline operation is temporarily stopped, and it is normally operated when the access operation is finished.

In addition, in another embodiment of the present invention, it is assumed that more than two external memories are accessed through one port. In this case, the signals similar to the external program request signal EPR and external data request signal EDR are generated by the memory access unit 106, and the priority is adjusted by a wait signal generation unit 111, so that more than two external memories are accessed.

In another embodiment of the present invention, if the operational speed of the internal memory is slow, the pipeline operation is temporarily stopped until the data is prepared. At this time, the pipeline stops without any interruption and returns to the normal operation.

As described above, in the present invention, when the external memory or the slow internal memory is accessed, the pipeline operation, which is being operated, is stopped until the data is prepared in the accessed memory. When the data preparation is finished, the pipeline is normally operated, so that an effective pipeline operation is implemented.

In addition, when the external program and data are concurrently requested, and more than two external memories are accessed through one port, the external program request signal and external data request signal are generated, and then the priority thereof is determined, thus performing an accessing operation, so that it is possible to perform a pipeline operation without any interruption.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A processor accessing an external program memory and external data memory through one port, comprising:

a program selection unit for carrying one of a program from an internal memory and an external program memory onto a program bus in accordance with an external program request signal and an external memory preparation signal;

an instruction fetch unit for fetching the program carried on the program bus in accordance with a program wait signal and a data wait signal and outputting an instruction;

an instruction decoding unit for decoding an instruction from the instruction fetch unit;

a control signal generation unit for fetching a decoding signal from the instruction decoding unit, outputting a control signal, and stopping a fetching operation of the decoding signal when the program wait signal or data wait signal is activated;

a program counter for accessing a program memory in accordance with a control signal from the control signal generation unit;

a memory accessing unit for judging whether an internal memory is accessed or an external memory is accessed in accordance with a program address from the program counter and a data address stored in the memory access unit, accessing an internal memory RAM when the internal memory is accessed, generating an external program request signal and external data request signal when the external memory is judged to be accessed, accessing the external program memory and external data memory, and disabling a request signal of the memory when the external memory ready signal is a high level;

a data selection unit for carrying, on the data bus, one of the data from the RAM and a data from the external data memory in accordance with an external memory ready signal and external data request signal;

a wait signal generation unit for enabling the program wait signal and data wait signal for temporarily stopping an internal pipeline operation when the external program request signal and external data request signal from the memory access unit are activated, disabling the program wait signal and data wait signal when the external memory ready signal becomes a high level, and normally maintaining the stopped pipeline operation; and an arithmetic operation unit for computing an internal or external output data based on an external or internal program in accordance with a control signal from the control signal generation unit.

2. The processor of claim 1, wherein said program selection unit includes:

a first AND-gate for ANDing an external program request signal, an external memory ready signal, and an inverted data ready signal; and a first multiplexer for selectively outputting a program from the internal ROM and the external program memory in accordance with an output signal from the first AND-gate.

3. The processor of claim 1, wherein said instruction fetch unit includes:

a second AND-gate for ANDing a clock signal, an inverted program wait signal, and an inverted data wait signal; and a first flip-flop for being clocked in accordance with an output signal from the second AND-gate, fetching the program carried on the program bus, and outputting an instruction.

4. The processor of claim 1, wherein said control signal generation unit includes:

an OR-gate for ORing a program wait signal and data wait signal;

a third AND-gate for ANDing an inverter output signal from the OR-gate and a clock signal;

second and third flip-flops for being clocked in accordance with an output signal from the OR-gate, fetching a decoding signal from the instruction decoding unit, and outputting a program counter control signal and a memory access unit control signal, respectively;

a second multiplexer for blocking an output from the second flip-flop in accordance with an output signal from the OR-gate;

a third multiplexer for blocking an output of a decoding signal from the instruction decoding unit in accordance with an output signal from the OR-gate;

a fourth AND-gate for ANDing a clock signal and inverted data wait signal;

a fourth flip-flop for being clocked in accordance with an output signal from the AND-gate, fetching an output signal from the third multiplexer, and outputting an arithmetic operation unit control signal; and a fourth multiplexer for blocking an output signal from the fourth flip-flop when a data wait signal is activated.

5. The processor of claim 1, wherein said data selection unit includes:

a fifth AND-gate for ANDing an external data request signal and external memory ready signal; and a fifth multiplexer for selecting outputting a data from the internal RAM or a data written in the program memory in accordance with an output signal from the fifth AND-gate.

* * * * *